(12) United States Patent
Tiihonen et al.

(10) Patent No.: US 11,063,536 B2
(45) Date of Patent: Jul. 13, 2021

(54) MINING VEHICLE AND METHOD FOR STARTING AN AC ELECTRIC MOTOR OF A MINING VEHICLE

(71) Applicant: SANDVIK MINING AND CONSTRUCTION OY, Tampere (FI)

(72) Inventors: Tommi Tiihonen, Tampere (FI); Harri Vatanen, Tampere (FI); Ville Ristimäki, Tampere (FI)

(73) Assignee: Sandvik Mining and Construction OY, Tampere (FI)

(*) Notice: Subject to any disclaimer, the term of this patent is extended or adjusted under 35 U.S.C. 154(b) by 0 days.

(21) Appl. No.: 16/601,122

(22) Filed: Oct. 14, 2019

(65) Prior Publication Data

US 2020/0119665 A1    Apr. 16, 2020

(30) Foreign Application Priority Data

Oct. 15, 2018   (EP) .................................... 18200486

(51) Int. Cl.

| | |
|---|---|
| *H02P 6/00* | (2016.01) |
| *H02P 6/21* | (2016.01) |
| *E21B 7/02* | (2006.01) |
| *H02P 6/06* | (2006.01) |

(52) U.S. Cl.
CPC .............. *H02P 6/005* (2013.01); *E21B 7/025* (2013.01); *H02P 6/06* (2013.01); *H02P 6/21* (2016.02)

(58) Field of Classification Search
CPC .................................. H02P 6/005; H02P 6/21
USPC ...................................................... 318/139, 34
See application file for complete search history.

(56) References Cited

U.S. PATENT DOCUMENTS

| | | | | |
|---|---|---|---|---|
| 4,908,565 A | * | 3/1990 | Cook ......................... | H02P 9/08 290/4 R |
| 5,903,116 A | * | 5/1999 | Geis .......................... | H02P 9/04 318/140 |
| 7,053,568 B2 | * | 5/2006 | Rudinec ................... | B60L 1/003 318/139 |
| 8,955,657 B2 | * | 2/2015 | Osara ....................... | B60L 53/20 191/3 |
| 2012/0298004 A1 | | 11/2012 | Osara et al. | |

FOREIGN PATENT DOCUMENTS

| | | |
|---|---|---|
| EP | 2738035 A1 | 6/2014 |
| EP | 3037297 A1 | 6/2016 |

* cited by examiner

*Primary Examiner* — David Luo
(74) *Attorney, Agent, or Firm* — Corinne R. Gorski

(57) ABSTRACT

For starting an AC electric motor of a mining vehicle, it is first accelerated to a first speed with a second AC voltage provided by an onboard battery-powered inverter of the mining vehicle. A phase of a first AC voltage taken from an external grid is compared to a phase of said second AC voltage. If the phase difference between the first and second AC voltages is larger than a predetermined limit, the speed at which said inverter rotates said AC electric motor is changed. If the difference between the phases of the first and second AC voltages is smaller than the predetermined limit, a change is made from rotating the AC electric motor with the second AC voltage to rotating the AC electric motor with the first AC voltage.

8 Claims, 3 Drawing Sheets

MINING VEHICLE AND METHOD FOR STARTING AN AC ELECTRIC MOTOR OF A MINING VEHICLE

RELATED APPLICATION DATA

This application claims priority under 35 U.S.C. § 119 to EP Patent Application No. 18200486.1, filed on Oct. 15, 2018, which the entirety thereof is incorporated herein by reference.

TECHNICAL FIELD

The invention is generally related to the technical field of electrically powered mining vehicles. In particular, the invention is related to the task of starting an AC electric motor of a mining vehicle so that excessive loading of an external electric grid can be minimized or avoided.

BACKGROUND

Mining vehicles, such as drilling rigs, excavators, loaders, trucks, and the like are traditionally powered by internal combustion engines. Recently, the development trend has been towards electrically powered mining vehicles having powerful electric motors that can be powered both from batteries carried by the mining vehicle and from an external electric grid. Advantages of electrically powered mining vehicles include, for example, less noise, less exhaust gases, waste heat, and requirements for fuel distribution on a site.

As an example, an electrically driven drilling rig, is shown schematically in FIG. 1 with the reference designator 100. The drilling rig includes a battery 101, an inverter 102, a switching block 103, and a main electric motor 104. A control computer 105 is configured to control at least the inverter 102 and the switching block 103, to which there is also a connection from an external grid connector 106.

The power produced by the main electric motor 104 of the drilling rig 100 can be directed either to running the hydraulic pumps of drilling actuators or to moving the vehicle. It is also possible to have separate electric motors for drilling and moving. Typically, the power of the motor 104 is used for drilling while the drilling rig 100 is in place at the end of a tunnel. When the holes are ready to be charged and blasted, the electric motor 104 is stopped for the time it takes to redirect the power to the driving mechanism that moves the wheels or tracks of the drilling rig 100. Thereafter, the motor 104 is started again for driving the drilling rig 100 to a safe location to wait for blasting the charges and removing the blasted stone.

The battery 101 of the electrically driven drilling rig 100 is typically not large enough to alone supply all the power that would be needed for extensive periods of drilling. Instead, the electrically driven drilling rig 100 is typically coupled to the electric grid on the site for all other periods than those when it moves from one place to another.

Starting a powerful electric motor is known to be a possible source of problems, the cause of which is the so-called inrush current. During a short period at start-up the motor may draw an electric current that is significantly higher than the steady-state current that the motor draws during normal operation.

FIG. 2 illustrates schematically some parts that have a role in starting the electric motor 104 according to the prior art. The switches 201 and 202 belong the switching block 103 in FIG. 1. The external electric grid 203 is shown schematically, and there are overload circuit breakers 204 and 205 both in the grid and within the drilling rig 100. A typical method to start the motor 104 may involve keeping switch 202 closed and switch 201 open, and do a so-called pre-acceleration of the motor 104 with electric power taken from the battery 101 through the inverter 102. Once the motor 104 rotates fast enough, switch 202 is opened and switch 201 closed. This way the electric grid 203 does not need to provide extensive inrush current for any prolonged period, because it only comes into play when the motor 104 is rotating already.

It has nevertheless shown to be difficult to make the external electric grid 203 take over the driving of the electric motor 104 smoothly. For example, in older mines the electric grid 203 may be dimensioned for such small maximum currents that the overload circuit breaker 204 of the grid trips when a motor starting procedure of the kind described above is attempted.

EP 3 037 297 A1 discloses an electrically driven mining vehicle in which the amount of reactive current supplied by a power electronics device and the amount of effective charging current for charging or discharging an auxiliary energy source are controlled with regard to a maximum current value of a supply cable.

US 2012/298004 A1 discloses an electrically driven mining vehicle that has one electric motor for operating a main function and another electric motor for operating an auxiliary function. Additionally, the vehicle includes a power-generating auxiliary unit from which power can be supplied to any of the electric motors.

SUMMARY

An objective of the invention is to present a mining vehicle and a method for starting an AC electric motor of a mining vehicle, so designed that they place only modest requirements to the current-providing capacity of an external electric grid. Another objective of the invention is that a prior art mining vehicle can be converted into a mining vehicle according to the invention with only modest requirements of overhaul or updating works.

These and other advantageous objectives are achieved by combining a phase comparison of the appropriate AC voltages with the starting-up procedure of the electric motor.

According to a first aspect, a mining vehicle is provided. The mining vehicle includes an AC electric motor for powering at least one of moving and drilling functions of the mining vehicle, and an external grid connector for receiving a first AC voltage from an external grid. The mining vehicle has a battery and an inverter coupled between the battery and the AC electric motor, for providing a second AC voltage. The mining vehicle includes a first controllable switch between the external grid connector and the AC electric motor, and a second controllable switch between the inverter and the AC electric motor. The mining vehicle includes a control computer coupled to the first controllable switch and to the second controllable switch and configured to control the coupling of the first and second AC voltages to the AC electric motor. The mining vehicle includes a first detector configured to detect a phase of the first AC voltage, and a second detector configured to detect a phase of the second AC voltage. The mining vehicle includes a synchronization comparator coupled to the first and second detectors and configured to produce a synchronization signal indicative of a phase difference between the first and second AC voltages. The control computer is configured to control the switching of the first and second switches on the basis of the synchronization signal.

According to an embodiment of the first aspect, the control computer is coupled to a first control input of the inverter and configured to provide the inverter with a speed reference signal. A speed detector of the AC electric motor is coupled to a second control input of the inverter and configured to provide the inverter with a speed feedback signal. The inverter is configured to control the provision of the second AC voltage to make the speed feedback signal match the speed reference signal. Accordingly, the invention can be easily applied as an upgrade to existing mining vehicles that already have similar connections to the inverter.

According to an embodiment of the first aspect, the inverter is coupled to an input of the control computer and configured to provide the control computer with a motor speed indicator signal. Accordingly, the control computer can perform its actions equipped with information about motor speed.

According to an embodiment of the first aspect, the mining vehicle includes a user interface coupled to the control computer for allowing information to be exchanged between the control computer and a user. Accordingly, the user may be given good control of and up-to-date information about the starting-up phase of the electric motor.

According to an embodiment of the first aspect, the control computer is configured to implement a motor start-up sequence that includes closing the second switch for coupling the second AC voltage to the AC electric motor, monitoring the synchronization signal to notice the phase difference between the first and second AC voltages becoming smaller than a predetermined limit, opening the second switch, and closing the first switch for coupling the first AC voltage to the AC electric motor. Accordingly, a systematic way is provided to avoid all occurrences of excessive inrush current.

According to an embodiment of the first aspect, the control computer is configured to proceed from the monitoring of the synchronization signal to the opening of the second switch as a response to noticing that the phase difference between the first and second AC voltages has remained smaller than the predetermined limit for a time that is longer than a predetermined delay. Accordingly, the operation of the switches is not attempted in excessively short time windows.

According to an embodiment of the first aspect, the mining vehicle is a rock-drilling rig. Accordingly, the advantageous features of the invention can be made available at locations deep in mines where the external electric grid is not always the strongest possible.

According to a second aspect, there is provided a method for starting an AC electric motor of a mining vehicle. The method includes accelerating the AC electric motor to a first speed with a second AC voltage provided by an onboard battery-powered inverter of the mining vehicle, comparing a phase of a first AC voltage taken from an external grid to a phase of the second AC voltage as a response to a difference between the phases of the first and second AC voltages being larger than a predetermined limit, changing the speed at which the inverter rotates the AC electric motor, and as a response to the difference between the phases of the first and second AC voltages being smaller than the predetermined limit, changing from rotating the AC electric motor with the second AC voltage to rotating the AC electric motor with the first AC voltage.

According to an embodiment of the second aspect, the method includes using the battery-powered inverter to generate the second AC voltage at a controllable frequency, receiving in the battery-powered inverter a speed reference signal indicative of a desired rotation speed of the AC electric motor and a speed feedback signal indicative of a detected rotation speed of the AC electric motor, and controlling the frequency of the second AC voltage to make the speed feedback signal match the speed reference signal. Accordingly, a systematic way is provided to avoid all occurrences of excessive inrush current.

According to an embodiment of the second aspect, the changing from rotating the AC electric motor with the second AC voltage to rotating the AC electric motor with the first AC voltage is done as a response to noticing that the phase difference between the first and second AC voltages has remained smaller than the predetermined limit for a time that is longer than a predetermined delay. Accordingly, the operation of the switches is not attempted in excessively short time windows.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 3:
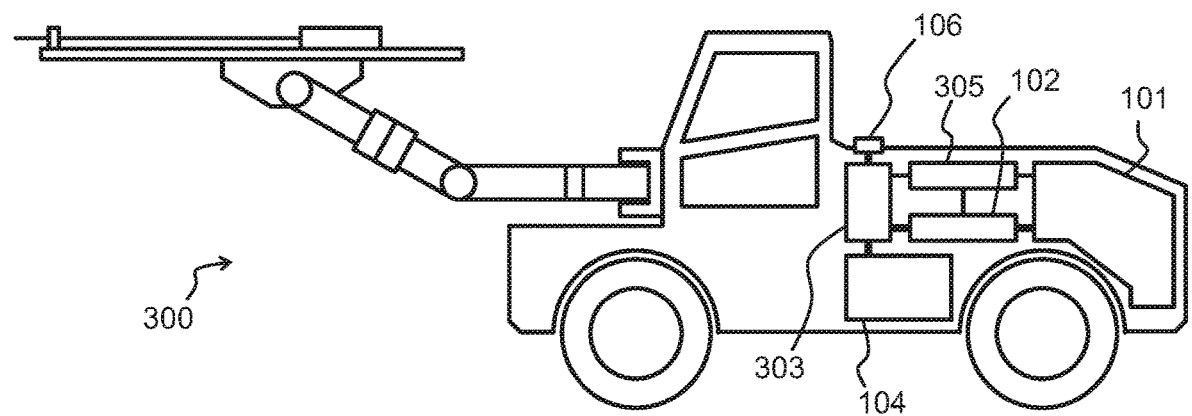
FIG. 3 is a schematic view of an electrically powered drilling rig.

FIG. 3 illustrates schematically an example of an electrically powered mining vehicle 300. Electrically powered means that the mining vehicle 300 includes at least one electric motor 104 that is powerful enough to power at least some of the main functions of the mining vehicle. In the example of FIG. 3, the mining vehicle 300 is a rock-drilling rig, main functions of which include drilling holes in rock and moving the vehicle around. In order to power at least one of these, the electric motor 104 should have a power of at least some tens of kilowatts, and preferably some hundreds of kilowatts. Even more powerful electric motors are not excluded.

The electric motor 104 can be an AC electric motor, as AC electric motors have many advantageous features like robustness, reliability, relatively straightforward controlling of speed, and good efficiency. How the output power of the AC electric motor 104 is transmitted further in the mining vehicle 300 is described further herein. As an example, the AC electric motor 104 may operate one or more hydraulic pumps that pump hydraulic fluid to actuators in drilling machines, wheel hub motors, and the like.

Figure 4:
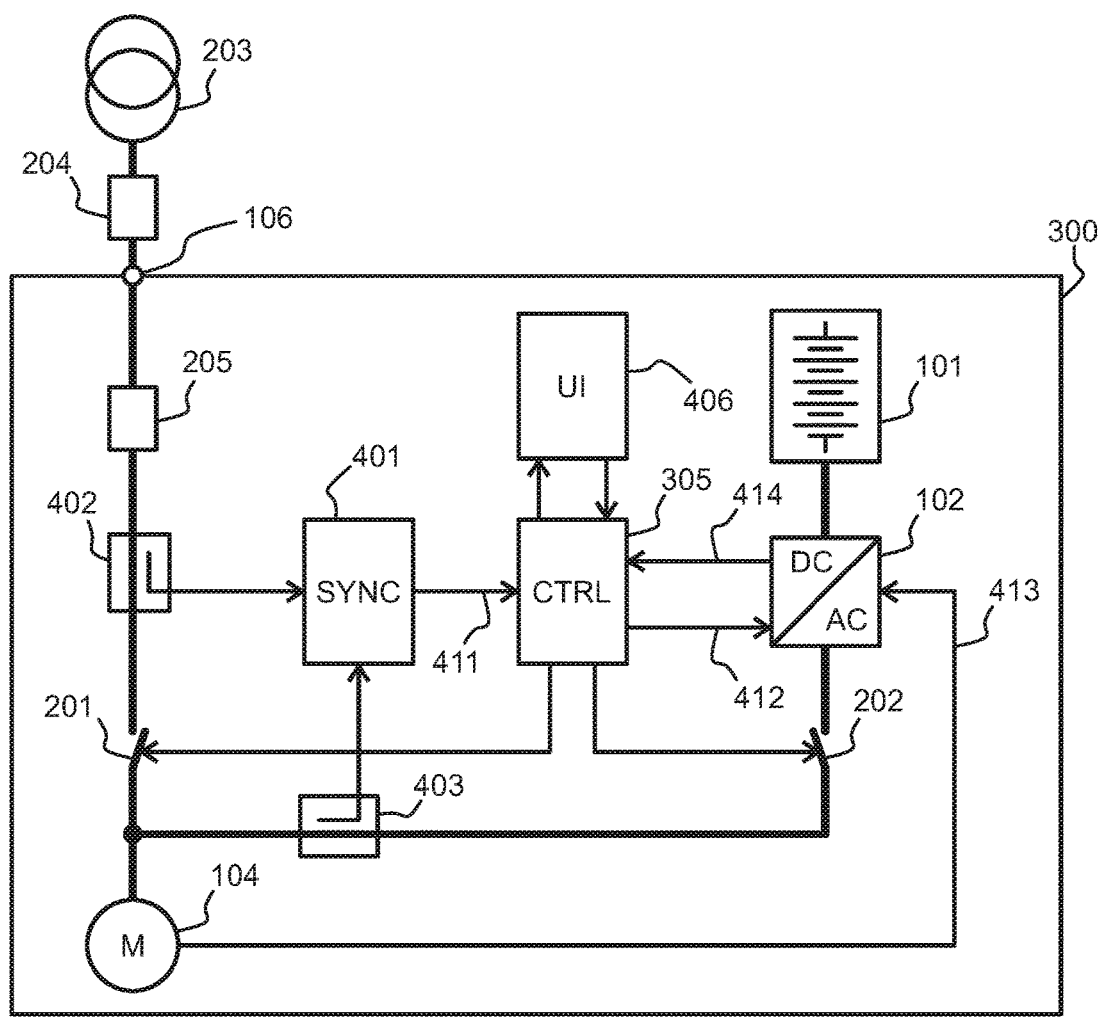
FIG. 4 is a schematic view of some electric parts and connections of an electrically powered mining vehicle.

FIG. 4 is a schematic block diagram of certain parts of the mining vehicle 300 that have a role in powering its main functions, like the moving and/or drilling functions. The same reference designators are used in the drawings for the same or essentially similar parts.

The mining vehicle 300 includes an external grid connector 106 for receiving a first AC voltage from an external grid 203. Overload circuit breakers 204 and 205 may be used in either the external grid 203 or the mining vehicle 300 or both to provide protection against potentially dangerous overcurrent situations. The external grid 203 may be, for example, the electric supply grid at a drilling site, such as a mine or a tunnel construction site.

The mining vehicle includes a battery 101, the storage capacity and discharge current rating of which are high enough to allow using electric energy from the battery 101 to operate the AC electric motor 104 at least for limited periods of time. An inverter 102 is coupled between the battery 101 and the AC electric motor 104 for providing a second AC voltage. Two controllable switches are shown in FIG. 4. A first controllable switch 201 is provided between the external grid connector 106 and the AC electric motor 104, and a second controllable switch 202 is provided between the inverter 102 and the AC electric motor 104. In the schematic illustration of FIG. 3 the first controllable switch 201 and the second controllable switch 202 belong to the switching block 303.

The amplitudes of the first and second AC voltages need not be the same. In typical operating environments of mining vehicles, the amplitude of the AC voltage that is available from the external grid 203 may vary between 380 and 690 volts. The amplitude of the AC voltage that can be provided with the battery 101 and inverter 102 has some maximum value, for example, 450 volts.

A control computer 305 is coupled to the first controllable switch 201 and the second controllable switch 202. The control computer 305 is configured to control the coupling of the first and second AC voltages to the AC electric motor 104, using the first and second switches 201 and 202 respectively. Parts of the control computer 305 and its couplings to the controllable switches 201 and 202 that enable such controlling are not shown in more detail in FIGS. 3 and 4, because the person skilled in the art can easily present a number of ways in which a control computer can be made to control the state of switches rated for the kinds of voltages and currents involved here.

The mining vehicle 300 includes a first detector 402 configured to detect a phase of the first AC voltage, and a second detector 403 configured to detect a phase of the second AC voltage. The places along the voltage lines where the detectors 402 and 403 are located are not significant, but in order to ensure that the phases of the first and second AC voltages can be detected separately, it is advantageous to have at least one controllable switch between them. In the example of FIG. 4, the first detector 402 is located between the external grid connector 106 and the first controllable switch 201, and the second detector 403 is located between the second controllable switch 202 and the AC electric motor 104. In the schematic illustration of FIG. 3, the first detector 402 and the second detector 403 may be included in the switching block 303.

The mining vehicle includes a synchronization comparator 401 coupled to the first and second detectors 402 and 403, and configured to produce a synchronization signal 411 indicative of a phase difference between the first and second AC voltages. The synchronization comparator 401 could also be called a phase comparator. The synchronization signal 411 may be as simple as a one-bit flag signal, so that one digital value means that the phases of the first and second AC voltages differ less than some predetermined limit, while the other digital value means that they differ more. In another embodiment the synchronization signal 411 could involve, e.g. a measure of the momentary phase difference between the first and second AC voltages, and/or some other information, like the rate and direction of change of the phase difference, the frequency difference of the first and second AC voltages, and/or others.

The control computer 305 is configured to control the switching of the first switch 201 and the second switch 202 on the basis of the synchronization signal 411. This enables the control computer 305 to effect the switching, so that during starting-up of the AC electric motor 104 the short bursts of inrush current can be reduced significantly.

It has been found that although the prior art method of pre-accelerating the electric motor with electric energy taken from a battery and only thereafter switching to the use of the grid helps to avoid the main part of inrush current, there remained the problem of re-magnetization current. According to prior art, the switch between the inverter and the AC electric motor was opened and the switch between the external grid connector and the AC electric motor subsequently closed, without taking the phase difference between the different AC voltages into account. This could lead to a situation in which the momentary rotational position of the rotor in the AC electric motor was not optimal at the moment when the first AC voltage was connected. This in turn could result in an inrush current spike that could last for only some milliseconds or tens of milliseconds, but could momentarily involve several hundreds of kilo-voltamperes in apparent power.

When the switching of the first switch 201 and the second switch 202 is accomplished on the basis of the synchronization signal 411, the first switch 201 can be closed at a moment of an optimal relationship to the rotational position of the rotor in the AC electric motor 104. Most advantageously, the switching moment is selected so that the phase difference between the first and second AC voltages is smaller than a predetermined limit. This way, the continuing operation of the AC motor with electric energy from the external grid can take maximum advantage of the remaining magnetization of the rotor in the AC electric motor 104, which in turn helps to suppress any inrush current spikes even in the milliseconds time scale.

It can be appreciated that is not reasonable to require that all inrush current bursts should be completely eliminated, for a number of reasons. Some inrush current may result from an amplitude difference between the AC voltage of the grid and the AC voltage that the inverter produces on board the mining vehicle. Also, there is some mechanical delay in the contactors that physically implement the first and second switches 201 and 202. Due to this mechanical delay, the AC electric motor 104 may slightly slow down during the short period when it does not receive any AC voltage. This causes a phase difference and gives rise to some inrush current.

The control computer 305 may be coupled to a first control input of the inverter 102 and configured to provide the inverter 102 with a speed reference signal 412. Depending on the way in which the control of the inverter 102 is implemented the speed reference signal 412 may be an analog signal or a digital signal. A speed detector (not separately shown) of the AC electric motor 104 may be coupled to a second control input of the inverter 102 and configured to provide the inverter 102 with a speed feedback signal. The inverter 102 may be configured to control the provision of the second AC voltage to the AC electric motor 104 to make the speed feedback signal 413 match the speed reference signal.

The rotating speed of an AC electric motor depends on the frequency of the AC voltage used to rotate it. Therefore, the means that the inverter 102 has at its disposal to make the speed feedback signal 413 match the speed reference signal 412 involve dynamically changing the frequency of the AC voltage it produces. This changing can be accomplished, for example, by applying some of the known control loop mechanisms, like proportional control, proportional-integral control, or proportional-integral-derivative control.

The inverter 102 may also be coupled to an input of the control computer 305 and configured to provide the control computer 305 with a motor speed indicator signal 414. It may be a copy of the speed feedback signal 413, and/or it may include further information like the momentary difference between the speed reference signal 412 and the speed feedback signal 413, or the rate at which the speed feedback signal 413 approaches the speed reference signal 412, or the like.

The mining vehicle may have a user interface 406 coupled to the control computer 305 for allowing information to be exchanged between the control computer 305 and a user of the mining vehicle. If the mining vehicle is of a manned type and includes a cockpit, the user interface 406 may be located in the cockpit. If the mining vehicle is of a remotely controlled type, the user interface 406 may be part of the remote workstation at which the mining vehicle is controlled. The user may use the user interface 406—for example, to initiate the starting up of the AC electric motor 104. The control computer 305 may also use the user interface 406 to give the user some up-to-date information about how the starting-up sequence proceeds.

An advantageous way in which the control computer 305 may be configured to implement a motor start-up sequence includes first closing the second switch 202. This causes the (second) AC voltage generated by the inverter 102 to be coupled to the AC electric motor 104. The motor starts to rotate, drawing electric energy from the battery 101 through the inverter 102. The rate at which the motor accelerates depends on its inertia and loading, as well as on the power that the inverter 102 can deliver to accelerate it and the frequency of the AC voltage it produces.

An aim of the acceleration phase is to make the AC electric motor 104 rotate at a speed and phase in synchronism with the (first) AC voltage that is available from the electricity grid 203. An indication of how well such synchronism has been achieved is available to the control computer 305 in the form of the synchronization signal 411, which indicates a phase difference between the first and second AC voltages. Therefore, the motor start-up sequence may include monitoring the synchronization signal 411 to notice when the phase difference between the first and second AC voltages becomes smaller than a predetermined limit. When that happens, the second switch 202 can be opened and the first switch 201 can be closed for coupling the first AC voltage to the AC electric motor 104 instead of the second AC voltage.

Figure 5:
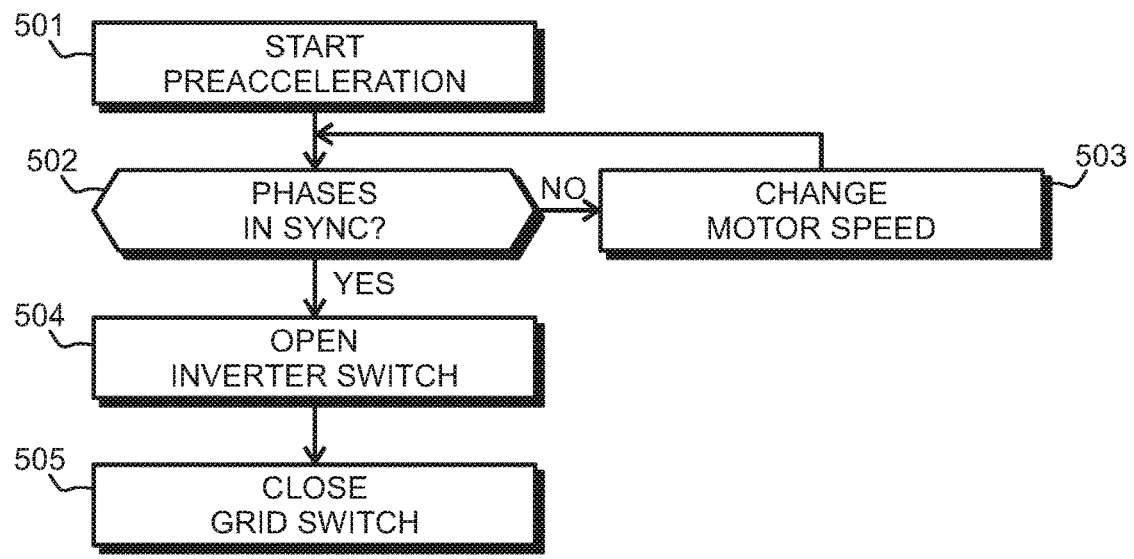
FIG. 5 illustrates a method and a computer program product.

This kind of a start-up sequence is illustrated in the form of the method in FIG. 5. Alternatively, FIG. 5 can be examined as an illustration of a computer program product comprising one or more sets of one or more machine-readable instructions that, when executed by one or more processors of the control computer 305 cause the implementation of the corresponding method.

Step 501 in the method includes accelerating the AC electric motor 104 to a first speed with a second AC voltage provided by an onboard battery-powered inverter 102 of the mining vehicle 300. This first speed should be selected so that the frequency of the second AC voltage, at which the first speed will be achieved, corresponds to the known frequency of the first AC voltage. In other words, step 501 may be considered to include using the second AC voltage to accelerate the AC electric motor 104 to the speed that it would eventually assume if the first AC voltage was used for the acceleration instead.

Step 502 in the method includes comparing a phase of the first AC voltage (taken from the external grid 203) to a phase of the second AC voltage. As long as the phases do not match, the motor speed (i.e. the frequency of the second AC voltage) must be changed. Thus, as a response to a difference between the phases of the first and second AC voltages being larger than a predetermined limit, the method includes changing the speed at which the inverter 102 rotates the AC electric motor 104 at step 503.

When the phases of the two AC voltages match, a switchover can be performed from using the second AC voltage to using the first AC voltage to rotate the AC electric motor 104. Thus, as a response to the difference between the phases of the first and second AC voltages being smaller than the predetermined limit, the method includes changing from rotating the AC electric motor 104 with the second AC voltage to rotating the AC electric motor 104 with the first AC voltage. This takes place by opening the second switch 202 at step 504 and closing the first switch 201 at step 505.

Steps 504 and 505 have been shown as separate steps and in this order in FIG. 5. Indeed, in order to avoid coupling the external grid 203 and the output of the inverter 102 to each other it is advisable to ensure that the first and second switches 201 and 202 are not conductive at the same time. However, at the same time it is advisable to minimize the time during which the AC electric motor 104 is without any operating voltage, and the electrical and mechanical properties of the components involved should be taken into account. It is very much possible that the first switch 201 is faster to open than the second switch 202 is to close, in which case, the control computer 305 might be arranged to issue the commands "open first switch 201" and "close second switch" simultaneously. The commands could be issued even in an inverse order if the electrical and mechanical properties of the components involved are such that in practice the first switch 201 will open anyway before the second switch 202 will close.

In the operation of the inverter 102, the method includes the steps of using the battery-powered inverter 102 to generate the second AC voltage at a controllable frequency, receiving in the battery-powered inverter 102 a speed reference signal 412 indicative of a desired rotation speed of the AC electric motor 104 and a speed feedback signal 413 indicative of a detected rotation speed of the AC electric motor 104, and controlling the frequency of the second AC voltage to make the speed feedback signal 413 match the speed reference signal 412.

Figure 6:
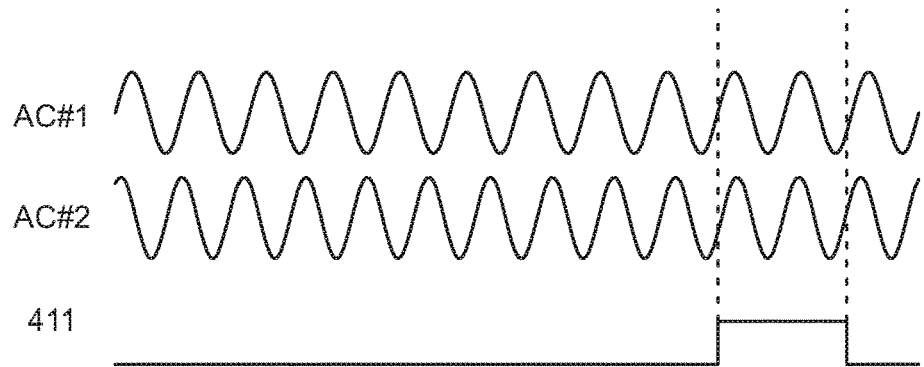
FIG. 6 illustrates a comparison of detecting the phase difference between two AC voltages in two different cases.
Figure 6:
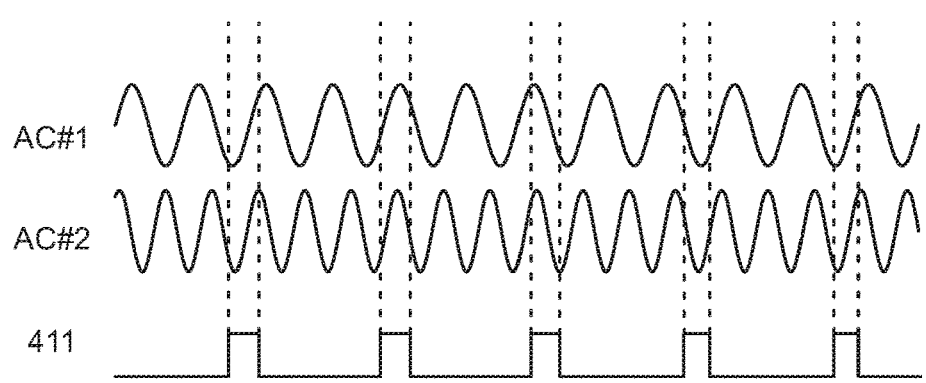

FIG. 6 illustrates a precaution that may be advantageous to take in order to ensure that the two AC voltages are indeed synchronized. Namely, it should be noted that even two AC voltages with significant difference in frequency will briefly have their phases almost equal for repeated, relatively short periods. The lower set of graphs in FIG. 6 illustrates two AC voltages AC #1 and AC #2 having a considerable difference in frequency. The value of the digital synchronization signal is high when the phase difference between the first and second AC voltages is smaller than a predetermined limit, and low otherwise. The upper set of graphs shows a similar case but with the frequencies of the two AC voltages closer to each other. In this case, the synchronization signal 411 will assume its high value more seldom but will remain high for a longer time.

In order to take the phenomenon illustrated in FIG. 6 into account the control computer 305 may be configured to proceed from monitoring the synchronization signal 411 to opening the second switch 202 as a response to noticing that the phase difference between the first and second AC voltages has remained smaller than the predetermined limit for a time that is longer than a predetermined delay. Another possibility would be to augment the phase comparison with another measurement that measured solely the difference in frequency and announced to the control computer when the difference in frequency was smaller than some predetermined limit. The results of both frequency and phase difference measurements can still be combined into one single-bit synchronization signal, for example, so that the synchronization comparator 401 will only activate the synchronization signal 411 when both the frequency measurement and the phase difference measurement show differences smaller than predefined limits.

Figure 1:
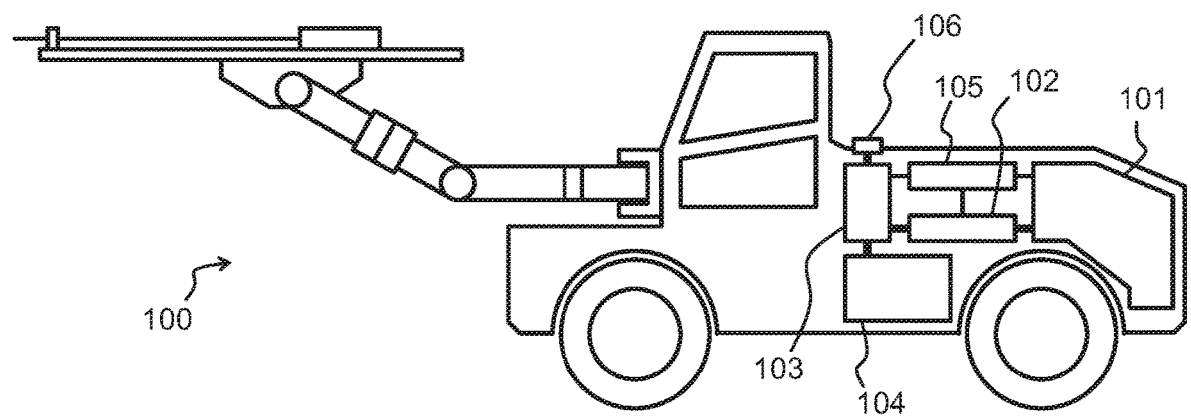
FIG. 1 is a schematic view of a prior art electrically powered drilling rig.
Figure 2:
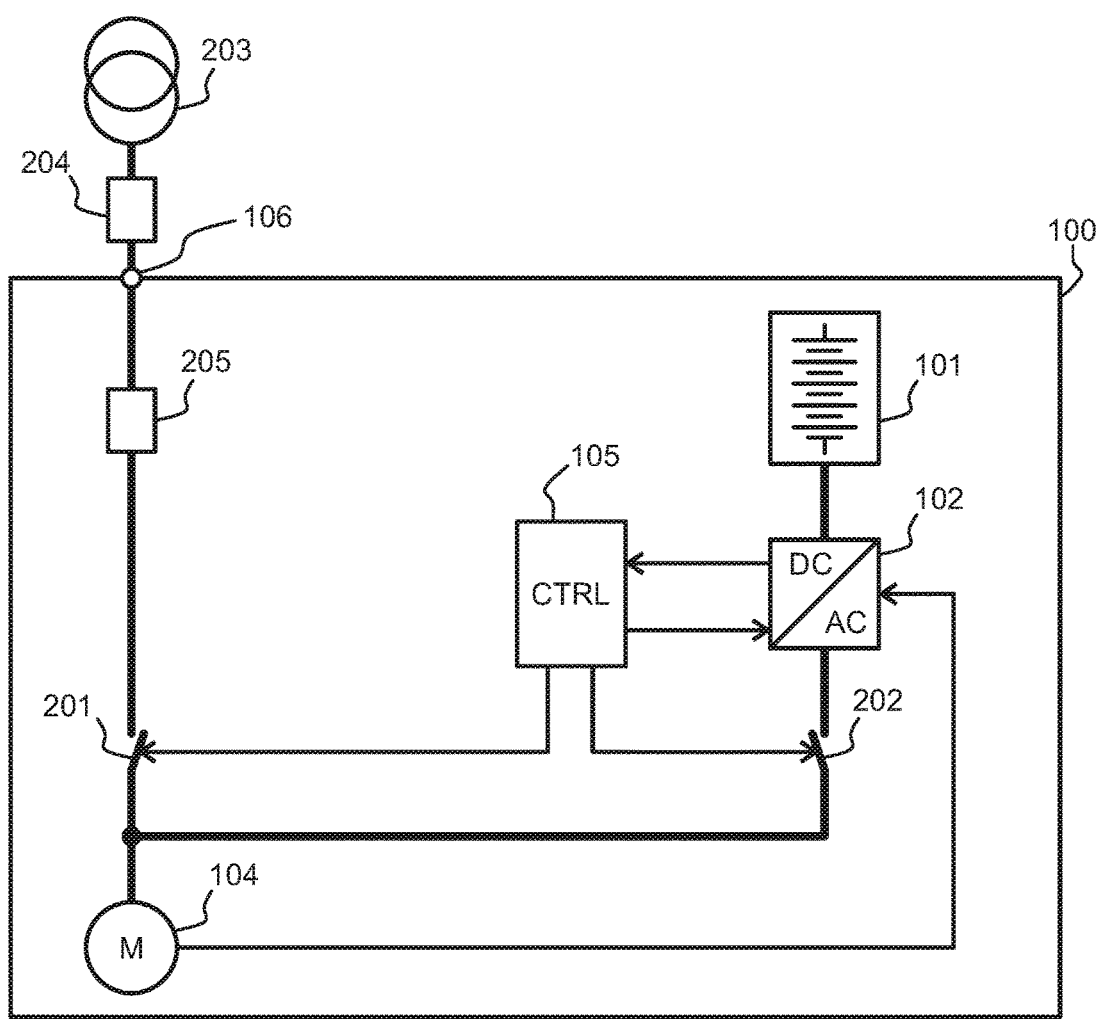
FIG. 2 is a schematic view of some electric parts and connections of a prior art drilling rig.

Comparing FIGS. 4 and 2 it is easy to see how the invention can be applied as an upgrade to a previously manufactured electrically powered mining vehicle. The battery 101, the inverter 102, the AC electric motor 104, the external grid connector 106, the switches 201 and 202, the overload circuit breaker 205, and the connections between these may remain the same. Only the first and second detectors 402 and 403 need to be added, as well as, the synchronization comparator 401 and the line for the synchronization signal 411. The first and second detectors 402 and 403 may be for example inductive detectors or otherwise such that they do not need any galvanic connection to the respective AC voltage lines, and the synchronization comparator 401 can be added as a small signal-processing box at a suitable location within the mining vehicle. Many industrial grade control computers have input/output lines free in any case, so one such input line just needs to be taken into use to make the control computer 305 able to receive the synchronization signal 411. Some updates are needed to the software that the control computer 305 executes, but industrial grade control computers are typically equipped for accepting software updates anyway, and procedures exist for performing such updates in a straightforward manner.

It is obvious to a person skilled in the art that with the advancement of technology, may be implemented in various ways. The invention and its embodiments are thus not limited to the examples described above, instead they may vary. As an example, even if the synchronization comparator 401 and the phase detectors 402 and 403 are shown as separate entities in FIG. 4, it is possible to combine the corresponding functionalities into a single component that gives a synchronization signal whenever the phases of the two examined AC voltages are sufficiently close to each other.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A mining vehicle, comprising:
   an AC electric motor arranged for powering at least one of moving and drilling functions of the mining vehicle;
   an external grid connector arranged for receiving a first AC voltage from an external grid;
   a battery, and an inverter coupled between said battery and said AC electric motor, the inverter being arranged for providing a second AC voltage;
   a first controllable switch between said external grid connector and said AC electric motor;
   a second controllable switch between said inverter and said AC electric motor;
   a control computer coupled to said first controllable switch and to said second controllable switch, and configured to control the coupling of said first and second AC voltages to said AC electric motor;
   a first detector configured to detect a phase of said first AC voltage;
   a second detector configured to detect a phase of said second AC voltage; and
   a synchronization comparator coupled to said first and second detectors and configured to produce a synchronization signal indicative of a phase difference between said first and second AC voltages, wherein said control computer is configured to implement a motor start-up sequence that includes closing said second switch for coupling said second AC voltage to said AC electric motor, monitoring said synchronization signal to notice said phase difference between said first and second AC voltages becoming smaller than a predetermined limit, opening said second switch, and closing said first switch for coupling said first AC voltage to said AC electric motor, wherein the control computer is coupled to a first control input of the inverter and configured to provide the inverter with a speed reference signal, a speed detector of the AC electric motor is coupled to a second control input of the inverter and configured to provide the inverter with a speed feedback signal, the inverter being configured to control the provision of said second AC voltage to make said speed feedback signal match said speed reference signal.

2. The mining vehicle according to claim 1, wherein the inverter is coupled to an input of the control computer and configured to provide the control computer with a motor speed indicator signal.

3. The mining vehicle according to claim 1, further comprising a user interface coupled to said control computer arranged for allowing information to be exchanged between the control computer and a user.

4. The mining vehicle according to claim 1, wherein the control computer is configured to proceed from said monitoring of said synchronization signal to said opening of said second switch as a response to noticing that the phase difference between said first and second AC voltages has remained smaller than said predetermined limit for a time that is longer than a predetermined delay.

5. The mining vehicle according to claim 1, wherein said mining vehicle is a rock-drilling rig.

6. A method for starting an AC electric motor of a mining vehicle, comprising the steps of:
   accelerating said AC electric motor to a first speed with a second AC voltage provided by an onboard battery-powered inverter of said mining vehicle; and
   comparing a phase of a first AC voltage taken from an external grid to a phase of said second AC voltage;
   in response to a difference between said phases of said first and second AC voltages being larger than a predetermined limit, changing the speed at which said inverter rotates said AC electric motor; and
   in response to said difference between said phases of said first and second AC voltages being smaller than said predetermined limit, changing from rotating said AC electric motor with said second AC voltage to rotating said AC electric motor with said first AC voltage.

7. The method according to claim 6, further comprising the steps of using said battery-powered inverter to generate said second AC voltage at a controllable frequency, receiving in said battery-powered inverter a speed reference signal indicative of a desired rotation speed of said AC electric motor and a speed feedback signal indicative of a detected rotation speed of said AC electric motor, and
controlling said frequency of said second AC voltage to make said speed feedback signal match said speed reference signal.

8. The method according to claim 6, wherein said changing from rotating said AC electric motor with said second AC voltage to rotating said AC electric motor with said first AC voltage is done in response to noticing that the phase difference between said first and second AC voltages has remained smaller than said predetermined limit for a time that is longer than a predetermined delay.

\* \* \* \* \*